May 27, 1947.  C. CAKEBREAD  2,421,183
APPARATUS FOR SPRAYING POWDERS, ATOMIZED LIQUIDS, AND THE LIKE
Filed Feb. 12, 1945
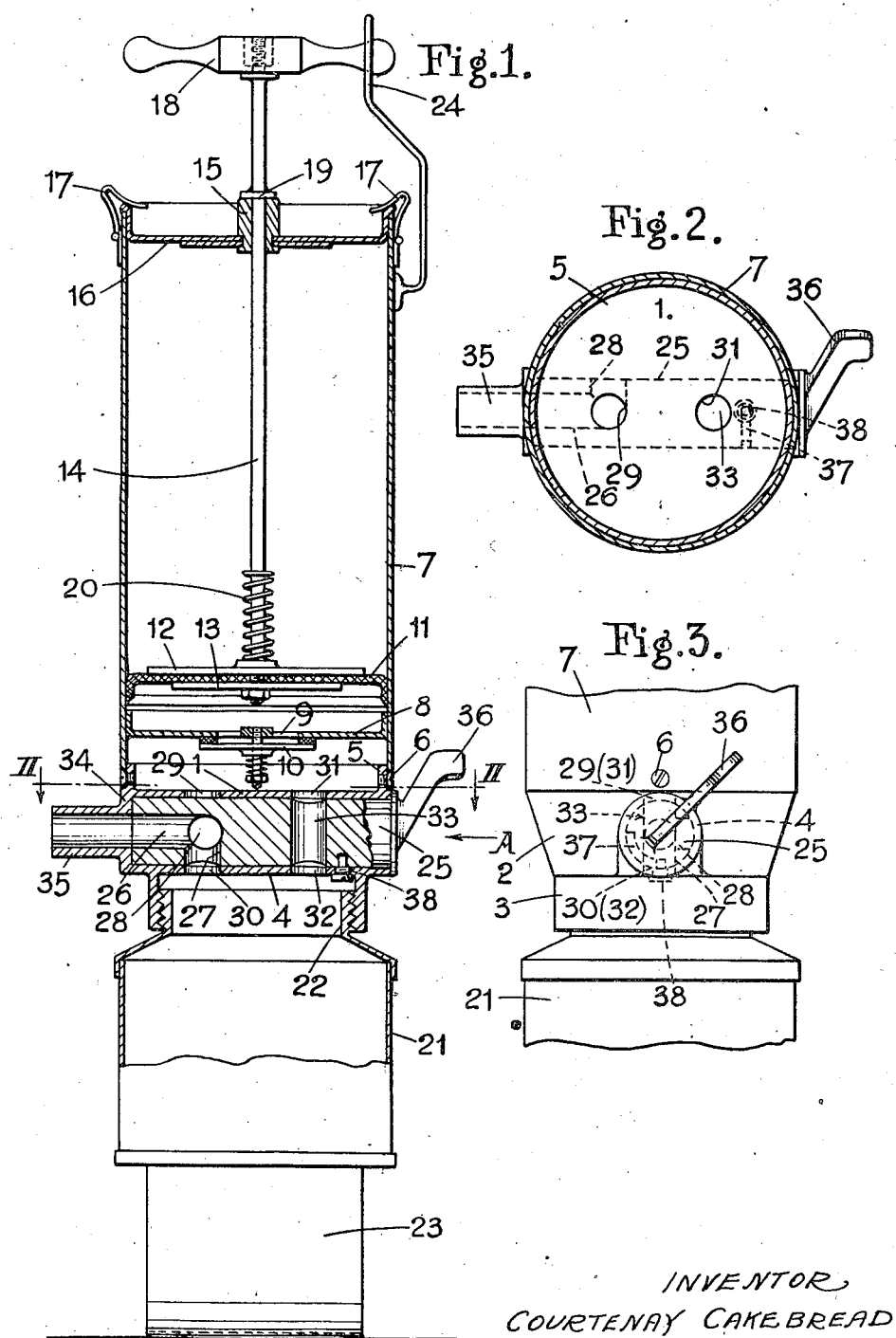
INVENTOR
COURTENAY CAKEBREAD Patented May 27, 1947

2,421,183

UNITED STATES PATENT OFFICE 2,421,183

APPARATUS FOR SPRAYING POWDERS, ATOMIZED LIQUIDS, AND THE LIKE

Courtenay Cakebread, Fortyhill, Enfield, England

Application February 12, 1945, Serial No. 577,547
In Great Britain July 3, 1944

2 Claims. (Cl. 222—4)

This invention has reference to apparatus for spraying dusts and powders or atomised liquids and the like, being particularly useful for spraying crops, applying fertilizers, fumigating buildings, and so forth.

The invention relates to spraying apparatus wherein air is delivered under pressure into a receptacle containing the dust or other spraying material which is thus forced through a discharge nozzle from whence it issues as a cloud or atomised stream, said apparatus having means to vary the disposition of various passages so that either air alone or an air-borne spraying material is sprayed from the apparatus.

The main object of the invention is to provide improved spraying apparatus of the character described with distributor means to enable the apparatus to be employed for spraying a dust or powder or an atomised liquid or for spraying air alone, or for blanking off the receptacle when not in use, so that the spraying material within the receptacle is sealed against any deleterious action of the atmosphere, especially when moist or humid, thereby not only preserving the material in a fresh and usable condition, but also preventing damage to the receptacle by reason of any corrosive action brought about by the atmosphere acting on the spraying material.

A further object of the invention is to provide a readily portable spraying apparatus of compact form and simple and sturdy construction and one which is easy to operate and economical to manufacture.

Spraying apparatus according to this invention broadly comprises the combination of an air pump, a receptacle for spraying material associated with the pump and distributor means adjustable at will for completely blanking off the receptacle from the air pump and for controlling the flow of air either directly to a discharge nozzle or indirectly through the receptacle to cause air-borne spraying material to issue as a cloud or an atomised stream from the apparatus.

The apparatus preferably incorporates valve means controlling the flow of air from and the degree of air pressure in the pump, a piston or other air compressing member reciprocable within a pump cylinder and a distributor housing separating the pump cylinder and the material receptacle and communicating with both, said distributor being of rotary barrel form and provided with air ports adapted to be aligned with or completely shut off from apertures in the housing to effect the results already referred to. The discharge nozzle conveniently extends out from the side of the apparatus in alignment with the horizontal axis of a transversely disposed cylindrical housing within which the barrel distributor is rockable within prescribed limits by exteriorly operable means.

Further novel features of construction will be apparent from the following description of the embodiment of the invention illustrated by the accompanying drawings, and wherein Figure 1 is a vertical sectional elevation of a portable spraying apparatus. Figure 2 is a sectional plan thereof on line II, II of Figure 1 and Figure 3 is a fragmentary side view looking in the direction of arrow A in Figure 1.

In the apparatus illustrated a structure, consisting of a metal casting or fabricated in a non-corrodible material, is employed which comprises a flat circular plate 1 constituting a cylinder bottom as hereinafter described, a tapering section 2 terminating in a parallel walled depending skirt 3, and a transversely disposed cylindrical housing 4, with its axis horizontal, extending diametrically within the tapering section 2 above the skirt 3.

The plate 1 has a peripheral flange 5 to which is secured by screws 6 an upstanding cylindrical shell 7 constituting the body of an air pump cylinder, having its axis vertically disposed. Above the plate 1 forming the cylinder bottom proper and spaced parallel thereto is a false bottom 8 having an air aperture 9 therein normally closed from the underside by a yielding disc valve 10 spring-pressed into the closing position. Within the cylinder shell 7 above the false bottom 8 is a disc piston comprising a flanged leather disc 11 clamped between two plates 12, 13 on and supported by a piston rod 14. The upper end of the piston rod 14 extends through a ferrule 15 secured to a detachable cover 16 normally retained in position by swingable spring clips 17 mounted on the shell 7 adjacent its upper rim, the upper extremity of the piston rod 14 carrying a cross-bar handle 18 by means of which the piston 11 can be reciprocated within the air cylinder of the pump. Downward movement of the piston rod 14 is limited by a collar 19 adapted to contact with the top of the ferrule 15 whilst a shock-absorbing coil spring 20 encircling the piston rod 14 buffers the piston on the upstroke by contacting with the bottom end of said ferrule 15.

A canister 21 of cylindrical form is attachable to the lower end of the structure 1 by a screw threaded rim 22 around the mouth of the canister 21 engaging within the internal thread in the skirt 3. To the underside of the canister 21 is affixed a stirrup 23 which supports the vertically and axially aligned canister 21 and cylinder 7 and which is adapted to receive the operator's foot to hold the apparatus to the ground when pumping. For carrying the apparatus conveniently when not in use the handle 18 may be engaged with a spring clip 24 mounted at the upper end of the cylinder 7, so that the drop of the apparatus on grasping the handle 18 is limited.

Within the transverse cylindrical housing 4 is a barrel distributor 25 having an axial passage 26 communicating with a pair of radial ports 27, 28 arranged in V or right-angular disposition. These ports 27, 28 may be aligned by rotating the distributor 25 with apertures 29, 30 arranged opposite one another in the plate 1 and the underside of the housing 4 respectively. Another pair of apertures 31, 32 is provided arranged to be connected by a diametrical port 33 in the distributor 25. One end of the housing 4 is closed by a wall 34 from which outwardly extends a discharge nozzle 35, whilst the other end of the housing 4 is open so that a handle 36 may be directly connected to the distributor 25 to effect its rotation. Rotation of the distributor 25 is limited by the engagement within an arcuate recess 37 in the distributor wall of a screwed pin 38 passing through the housing wall, said pin 38 serving also to hold the distributor 25 against endwise movement within its housing 4.

The operating handle 36 may be set in three positions to effect the sealing of the canister 21 against the ingress of air, the passing of air under pressure into the canister 21 to collect spraying material which is discharged as a cloud or atomised stream or the passing of air under pressure direct to the discharge nozzle, the canister being sealed against ingress of air.

In the position of the distributor 25 shown in the drawings air passes from the cylinder 7 through the unidirectional air valve 10 and across the housing 4 through apertures 31, 32 therein and the connecting port 33 in the distributor 25 into the canister 21, where the air collects spraying material which issues in air-borne condition through nozzle 34 via the aperture 30 in the housing 4 and the radial port 27 and axial passage 26 in the distributor 25, the passage 26 being axially aligned with said nozzle 35. This position of the distributor 25 represents one limit of its rockable movement and is determined by the pin 38 contacting with one end of the arcuate distributor recess 37.

When the handle 36 is swung over to the opposite side to the other limit of the rockable movement of the distributor 25, in which pin 38 contacts with the opposite end of recess 37, the diametrical port 33 and radial port 27 are set crosswise and thus effectively sealed off from the supply of air, and air under pressure passes through cylinder bottom aperture 29 and radial port 28, now registering with aperture 29, into the axial passage 26, issuing alone through the nozzle 35.

The third operative position possible for the distributor 25 is intermediately between those already described, the handle 36 being vertically disposed. In this position the three ports 27, 28 and 30 are all set obliquely and all communication between cylinder 7 and canister 21 prevented, spraying material within canister 21 being thereby preserved against the action of the atmosphere thereon.

I claim:

1. Spraying apparatus comprising in combination a canister for holding spraying material, an air cylinder in axial alignment with the receptacle, a piston within the cylinder, an external handle for reciprocating the piston, a valve controlling flow of air from the cylinder, a cylindrical distributor housing in direct communication with apertures in canister and cylinder, a rotary barrel distributor within the cylindrical distributor housing, a transverse port in the distributor adapted to connect the apertures in canister and cylinder to provide passage for air under pressure to the canister, a pair of ports in V-disposition in the distributor respectively connecting the air cylinder direct to an axial passage in the distributor or the canister to the same axial passage for egress therethrough of air-borne material from the canister, a discharge nozzle connecting with said axial passage in the distributor and means for rotating the distributor to bring the appropriate ports into action.

2. Portable spraying apparatus comprising in combination an upper vertical air cylinder, a detachable cylinder cover, a structure forming the cylinder bottom proper and with a transverse bore, open at one end, extending diametrically and horizontally through a skirt portion of the structure, a false bottom to the cylinder located above the cylinder bottom proper, a spring-controlled yielding disc normally closing an aperture in said false bottom, a piston slidable within the cylinder, an exteriorly operable piston rod attached to the piston and extending through the cylinder cover, a depending canister for holding spraying material and making screw threaded engagement with the skirt aforesaid, the canister being axially aligned with the cylinder, a rotary barrel distributor housed in the transverse bore of said cylinder bottom structure with ports in the distributor effective on rotation of the distributor completely to seal the canister from the atmosphere, to pass air under pressure alone or to direct air under pressure through the canister to collect spraying material therefrom, a nozzle for discharging air alone or air-borne spraying material and extending from the closed end of the transverse bore housing the distributor, an exteriorly operable handle directly connected with the distributor through the open end of the aforesaid transverse bore, means for limiting rocking movement of the distributor and a stirrup support for the apparatus affixed to the bottom of the canister.

COURTENAY CAKEBREAD.

REFERENCES CITED

The following references are of record in the file of this patent:

UNITED STATES PATENTS

| Number | Name | Date |
|---|---|---|
| 1,256,870 | Buck | Feb. 19, 1918 |

FOREIGN PATENTS

| Number | Country | Date |
|---|---|---|
| 399,395 | Germany | July 23, 1924 |